United States Patent [19]

Rollins, Jr.

[11] 3,971,536
[45] July 27, 1976

[54] COMBINED HELICOPTER FLIGHT CONTROLLER

[75] Inventor: John H. Rollins, Jr., Aberdeen, Md.

[73] Assignee: The United States of America as represented by the Secretary of the Army, Washington, D.C.

[22] Filed: June 10, 1975

[21] Appl. No.: 585,627

[52] U.S. Cl. .............................. 244/83 F; 74/471 R; 244/83 J
[51] Int. Cl.² ......................................... B64C 27/56
[58] Field of Search ............ 244/83 F, 83 J, 17.13, 244/17.11; 74/471 R

[56] References Cited
UNITED STATES PATENTS

| | | | |
|---|---|---|---|
| 2,572,649 | 10/1951 | Moeller | 244/17.11 |
| 3,053,326 | 9/1962 | Derschmidt | 74/471 R |
| 3,403,576 | 10/1968 | Ratliff | 244/83 F X |

Primary Examiner—Trygve M. Blix
Assistant Examiner—Barry L. Kelmachter
Attorney, Agent, or Firm—Nathan Edelberg; Robert P. Gibson; Saul Elbaum

[57] ABSTRACT

A helicopter rotor control mechanism is provided in which cyclic and collective rotor control functions are performed by a single control wheel having three degrees of freedom and operable by either or both hands of the pilot as desired. The control wheel is rotatable and translatable on one axis and tiltable about another to perform lateral, collective and pitch controls, respectively, through non-interacting linkages driving conventional collective control, lateral control and pitch control push rods connected to a conventional rotor control head of the swash plate type.

9 Claims, 2 Drawing Figures

COMBINED HELICOPTER FLIGHT CONTROLLER

RIGHTS OF THE GOVERNMENT

The invention described herein may be manufactured, used, and licensed by or for the United States Government for governmental purposes without the payment to me of any royalty thereon.

FIELD OF INVENTION

This invention relates to flight control means for helicopters and more particularly to a single flight control means having the capability of effecting both the collective and cyclic control functions in helicopters utilizing main rotor controls of the swash plate type.

BACKGROUND OF THE INVENTION

In swash plate rotor controls, the swash plate is mounted for simultaneous rotation on two gimbaled horizontal axes and has a third degree of freedom in the vertical direction. The vertical articulation of the swash plate results in changes in overall rotor-blade pitch regardless of the axial position of the blade. This pitch control is referred to in the art as collective pitch control or collective control. Orientation control of the swash plate combined with its freedom to rotate on its two gimbaled axes induces cyclic changes in the rotor-blade pitch as the blade sweeps through 360° of axial rotation. this pitch control is referred to in the art as cyclic pitch control or cyclic control.

Collective pitch controls the amount of thrust produced by the rotor and cyclic pitch induces changes in the plane of rotation of the rotor about the longitudinal and lateral axes of the helicopter airframe to provide translational control.

Heretofore, these two basic functions have been isolated into two separate lever controls utilized by the aviator, namely, the collective and cyclic controls. In order to maintain the velocity vector of a helicopter in various modes of helicopter flight, there are encountered situations that require coordinated and simultaneous movement of the collective and cyclic controls. This requires the use of both hands by the pilot and thus defines a long standing problem in the art.

If only one hand is needed by a helicopter pilot to effect both collective and cyclic controls, the difficulty of overall flight task accomplishment would be measurably reduced and would be of invaluable assistance in maintaining continuous flight should the pilot be injured, for example, under battle conditions in military applications.

It is, therefore, an object of the present invention to provide a new and novel flight control means for helicopters capable of effecting in a single control means both the cyclic and collective control functions in a swash plate controlled rotor system which is of simplified construction, readily adaptable to existing aircraft and of simplified operation.

Another object of the present invention to provide a new and novel flight control means for helicopters capable of effecting in a single control means both the cyclic and collective control functions in a swash plate controlled rotor system which is of simplified construction, readily adaptable to existing aircraft and of simplified operation; and in which only one hand of the pilot is required to effect such control functions.

These and other objects of the invention will become more fully apparent with reference to the following specification and drawings which relate to a preferred embodiment of the present invention.

SUMMARY OF THE INVENTION

The invention basically comprises a control wheel or the like mounted on a main control shaft, the latter being journaled for rotation and translation on its longitudinal axis. The control wheel is further mounted to be tilted fore and aft, thereby providing three degrees of freedom with which to effect control functions. Axial translation (fore and aft) of the control wheel and main control shaft effects the collective control function; rotation of the control wheel and main control shaft effects lateral cyclic control; and tilting of the control wheel fore and aft effects fore and aft cyclic control. The collective and the lateral and fore-and-aft cyclic control functions are effectuated in like manner to the performance thereof by conventional collective and cyclic control sticks and mechanisms while combining these control functions into a single flight control mechanism which permits either or both hands to be utilized in performing all of the collective and cyclic control functions.

DETAILED DESCRIPTION OF THE DRAWINGS

Figure 1:
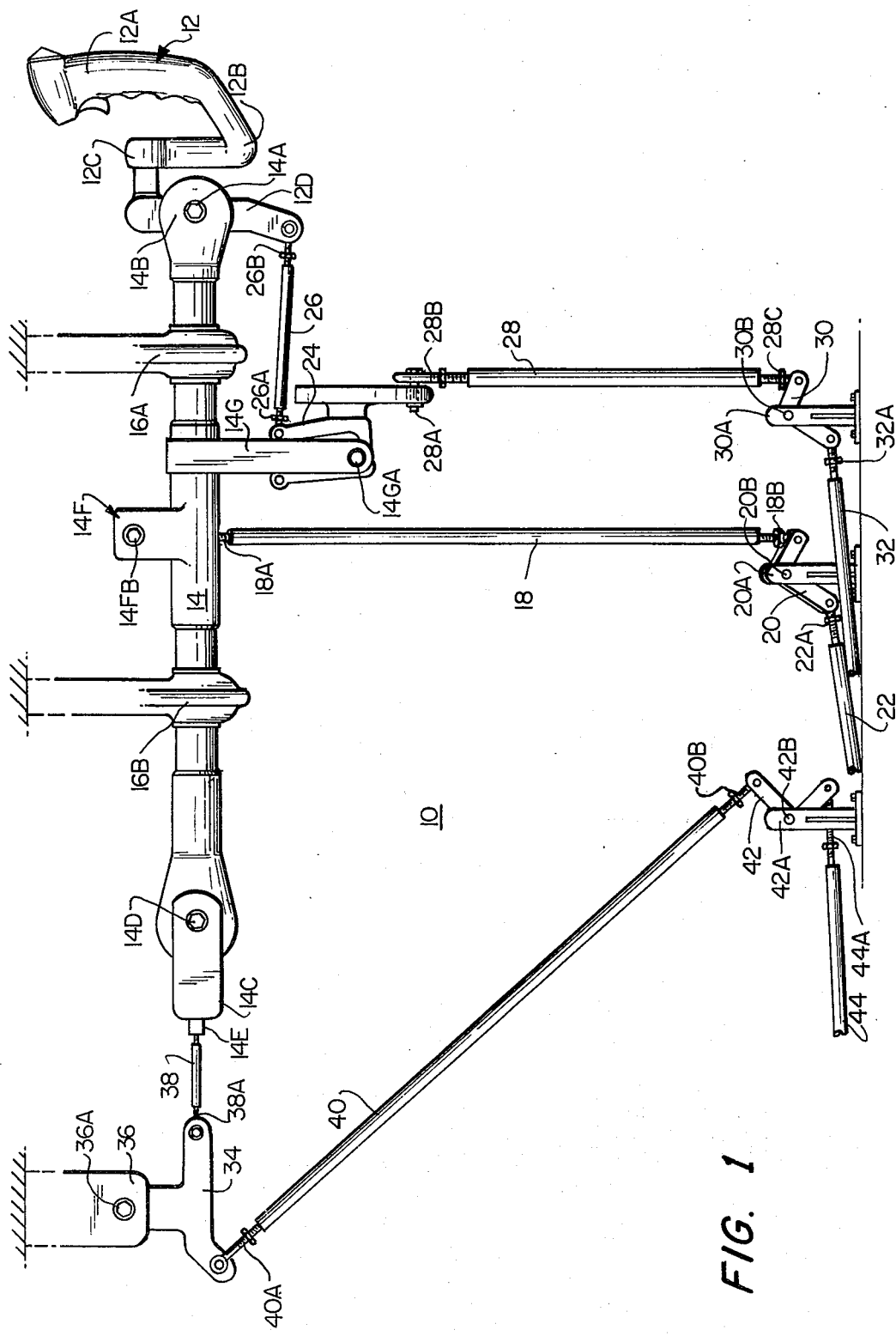
FIG. 1 is a side elevation of the flight control mechanism of a preferred embodiment of the present invention.
Figure 2:
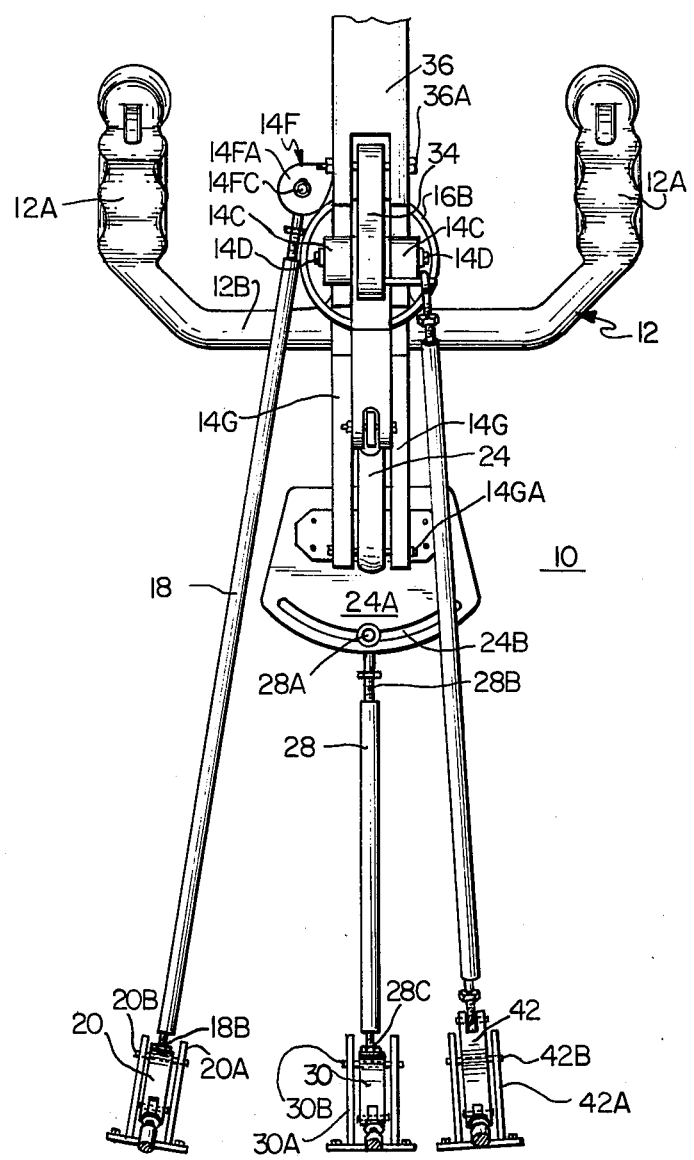
FIG. 2 is an end view of the flight control mechanism shown in FIG. 1.

Referring in detail to the drawings and with reference to both FIGS. 1 and 2, the flight controller 10 of the present invention is shown as including a control wheel 12 or the like configured to include two upstanding hand grips 12A on a basically U-shaped bar 12B.

The control wheel 12 is mounted on one end of a main control shaft 14 by means of an upstanding hub portion 12c which is pivoted in a vertical (fore and aft) plane on one end of a bell crank lever 12D by means of a horizontal pivot pin 14A in a bifurcated end portion 14B of the main control shaft 14, the said pivot pin 14A extending through the longitudinal axis of the shaft 14. Since the hub portion 12C of the control wheel 12 is radially outboard of the longitudinal axis of the main control shaft 14, turning the control wheel about the hub portion 12C imparts, through the pivot pin 14A, rotation of the main control shaft 14 which is mounted for rotation about its longitudinal axis in a pair of axially spaced journal bearings 16A and 16B. The journal bearings 16A and 16B also permit longitudinal translation of the main control shaft 14 therein, such that pushing or pulling on the control wheel through the pivot pin 14A causes the main shaft to move left and right, respectively, with reference to the configuration shown in FIG. 1.

At the opposite end of the main control shaft 14 from the control wheel 12 is a bifurcated output coupling 14C having a pivot pin 14D mounting the forked end thereof on the said opposite end of the shaft 14, the pivot pin 14D being parallel to the horizontal pivot pin 14A and extending through the longitudinal axis of the main control shaft 14. A swivel coupling 14E is provided on the output coupling 14C on the longitudinal axis of the main control shaft 14 for a purpose to be described hereinafter.

Between the ends of the main control shaft 14 are mounted first and second radial control levers 14F and 14G oriented 14E that the first control lever 14f extends above and to one side of the main control shaft 14 and the second control lever 14G extends below said shaft 14 shown in FIGS. 1 and 2.

The first radial control lever 14F includes a bifurcated coupling 14FA mounted thereon by a bolt 14FB (FIG. 1) and holding a pivot pin 14FC (FIG. 2) outboard of the main control shaft 14 parallel to the longitudinal axis of the latter.

A first push rod 18 having adjustable pivotal couplings 18A and 18B at opposite ends thereof is connected by the coupling 18A to the pivot pin 14FC on the first radial control lever 14F, hereinafter referred to as the lateral control lever 14F. The other coupling 18B is pivotally connected to one end of a first bell crank lever 20 pivotally mounted in a bifurcated stanchion 20A about a horizontal pivot pin 20B. The first bell crank lever 20 is connected at its other end through a pivotal coupling 22A to one end of a lateral control push rod 22 which extends to and is connected at its other end to a conventional helicopter rotor control head (not shown) of the swash plate type.

The second radial control lever 14G, hereinafter referred to as the pitch control support lever 14G, supports a horizontal pivot pin 14GA disposed outboard of and orthogonal to the longitudinal axis of the main control shaft 14. This pivot pin 14GA pivotally supports the intermediate portion of a second bell crank lever 24 which is pivoted in a vertical plane (as shown) and has one end connected to a pivotal coupling 26A on one end of a second push rod 26, the latter having a pivotal coupling 26B at the other end thereof connected to the lower outboard end of the bell crank portion 12D of the control wheel 12, said bell crank portion 12D being hereinafter referred to as the pitch control crank 12D.

Mounted transversely of the pivotal plane of the second bell crank 24 on the other end thereof is a dependent plate member 24A having an arcuate slot 24B defined therein, through which slot is connected, by a roller bearing means 28A and a pivotal coupling 28B, one end of a third push rod 28. The other end of the third push rod 28 is connected through another pivotal coupling 28C to one end of a third bell crank 30, the latter being pivotally mounted intermediate its ends in a vertical plane in a second vertical stanchion 30A about a horizontal pivot pin 30B therein. The other end of the third bell crank 30 is connected through a pivotal coupling 32A to one end of a pitch control push rod 32, the latter having its other end coupled to a conventional helicopter rotor control head (not shown) of the swash plate type.

At the opposite end of the main control shaft 14 from the control wheel 12, a fourth bell crank, hereinafter referred to as the collective control crank 34 is pivotally mounted in a vertical plane (as shown) on a horizontal pivot 36A pin held in a dependent bifurcated stanchion 36. One end of the collective control crank 34 is connected through a pivotal coupling 38A on one end of a fourth push rod 38, the other end of the latter being connected to the swivel coupling 14E on the output coupling 14C coaxially with the main control shaft 14, the said swivel coupling 14E permitting full relative rotation between the main control shaft 14 and fourth push rod 38.

The other end of the cyclic control crank 34 is connected through a pivotal coupling 40A to one end of a fifth push rod 40, the latter having its other end connected through a pivotal coupling 40B to one end of a fifth bell crank 42.

The fifth bell crank 42 is pivotally mounted intermediate its ends in a vertical plane on a horizontal pivot pin 42B in a vertical stanchion 42A. The other end of the fifth bell crank 42 is connected through a pivotal coupling 44A to one end of a collective control push rod 44, the latter having its other end coupled to a conventional helicopter rotor control head (not shown) of the swash plate type.

OPERATION OF THE INVENTION

All control motions previously performed in the prior art by the collective and cyclic control sticks in helicopters are now incorporated into the control wheel 12 by the linkage previously described herein.

To effect a collective control action, the control wheel 12 is moved fore and aft to constrain a longitudinal displacement of the main control shaft 14 in the bearings 16A and 16B via the bearings 16A and 16B via the hub portion 12C and pivotal connection 14A. This results in a corresponding displacement of the fourth push rod 38 and of the collective control crank 34 about its pivot 36A, thereby driving the fifth push rod 40 and fourth bell crank 42 to effect a correspondingly proportionate control displacement of the collective control push rod 44. Collective control input displacements can thus be generated at the rotor control head.

The lateral and pitch controls of the cyclic control function are effected as follows:

Lateral control is initiated by rotation of the control wheel 12 thereby constraining a like rotation of the main control shaft 14 in the bearings 16A and 16B via the wheel hub 12C and pivot pin 14A. This rotation of the main control shaft 14 results in an arcuate displacement of the lateral control lever 14F and the pitch control support lever 14G. The arcuate displacement of the pitch control support lever is ineffective, however, since the roller bearing assembly 28A rides freely in the arcuate slot 24B in the dependent plate member 24A, thereby precluding interaction between the lateral and pitch control systems in the cyclic control function. The arcuate displacement of the lateral control lever, however, constrains a corresponding displacement of the first push rod 18 via the bifurcated coupling 14FA, pivot pin 14FC and pivotal coupling 18A, resulting in a corresponding displacement of the first bell crank 20 about its pivot 20B via the pivotal coupling 18B to thereby drive the lateral control push rod 22 through a correspondingly proportionate lateral control displacement. Lateral control input displacements can thus be generated at the rotor control head.

Pitch control is initiated by fore and aft tilting of the control wheel 12 and the pitch control crank 12D about the pivot pin 14A on the main control shaft 14. This imparts a corresponding axial displacement to the second push rod 26 via the pivotal coupling 26B and a corresponding arcuate displacement of the second bell crank 24 and dependent plate member 24A about the pivot pin 14GA via the pivotal coupling 26A. The arcuate displacement of the dependent plate member 24 constrains the third push rod 28 through a corresponding longitudinal displacement via the roller bearing assembly 28A and pivotal coupling 28B which in turn imparts a corresponding arcuate displacement of the third bell crank 30 about its pivot 30B via the pivotal coupling 28C. This effects a correspondingly proportional control displacement of the pitch control push rod 32 through the pivotal connection 32A. Pitch control input displacements can thus be generated at the rotor control head.

The foregoing apparatus may be readily adapted to the requisite control displacement ranges of various helicopters by selective sizing of the various bell crank arms and control push rods.

It is to be understood that rotor control heads as referred to herein are conventional swash plate type control heads such as those presently requiring separate collective and cyclic function control sticks for operation.

I wish it to be understood that I do not desire to be limited to the exact details of construction shown and described, for obvious modifications can be made by a person skilled in the art.

I claim:

1. A flight control means for helicopters comprising:
   integrated control means for generating cyclic and collective control function commands for rotor control heads of the swash plate type;
   mounting means comprising a main control shaft for mounting said integrated control means for rotation in a first plane to provide a first cyclic control input, for rotation in a second plane on an axis orthogonal to that of said main control shaft to provide a second cyclic control input, and for translation in a third plaen parallel to said second plane to provide a collective control input;
   first displaceable output means responsive to rotation of said integrated control means in said first plane to provide a first cyclic control command;
   second displaceable output means responsive to rotation of said integrated control means in said second plane to provide a second cyclic control command; and
   third displaceable output means responsive to translation of said integrated control means in said third plane to provide a collective control command.

2. The invention defined in claim 1, wherein said displaceable output means include first, second and third control push rods, respectively interconnected with integrated control means for longitudinal displacement in response to movements of said integrated control means in said first, second and third planes; and
   wherein said first and second cyclic control commands and said collective control command comprise, respectively, first, second, and third respective displacements of said control push rods, said displacements being proportional to the magnitude of rotation and translation of said integrated control means in said first, second and third planes, respectively.

3. A flight control means for helicopters comprising;
   integrated control means for generating cyclic and collective control function commands for rotor control heads of the swash plate type;
   mounting means comprising a main control shaft for mounting said integrated control means for rotation in a first plane to provide a first cyclic control input, for rotation in a second plane on an axis orthogonal to that of said main control shaft to provide a second cyclic control input, and for translation in a third plane parallel to said second plane to provide a collective control input;
   first displaceable output means responsive to rotation of said integrated control means in said first plane to provide a first cyclic control command, comprising a first control lever integrally connected with said integrated control means for rotation in said first plane, a first intermediate push rod pivotally connected at one end of said first control lever, a first bell crank means pivotally connected at one end to the other end of said first intermediate push rod, and a first control push rod pivotally connected at one end to the other end of said first bell crank means;
   second displaceable output means responsive to rotation of said integrated control means in said second plane to provide a second cyclic control command, comprising a second control lever integrally connected with said integrated control means for rotation in said second plane, a second bell crank means, a second intermediate push rod pivotally connected at its ends to said second control lever and to one end of said second bell crank means, a third bell crank means, a third intermediate push rod pivotally connected at its ends between the other end of said second bell crank means and one end of said third bell crank means, and a second control push rod pivotally connected at one end to the other end of said third bell crank means; and
   third displaceable output means responsive to translation of said integrated control means in said third plane to provide a collective control command, comprising fourth bell crank means having one end thereof pivotally interconnected with said integrated control means and responsive to translation of said integrated control means for rotation in said third plane, fifth bell crank means, a fourth intermediate push rod pivotally connected at its ends between the other end of said fourth bell crank means and one end of said fifth bell crank means, and a third control push rod pivotally connected at one end to the other end of said fifth bell crank means; and
   wherein said first and second cyclic control commands and said collective control command comprise, respectively, first, second and third respective displacements of said first, second and third control push rods, said displacements being proportional to the magnitude of rotation and translation of said integrated control means in said first, second and third planes, respectively.

4. A flight control means for helicopters comprising
   integrated control means for generating cyclic and collective control function commands for rotor control heads of the swash plate type:
   mounting means comprising a main control shaft for mounting said integrated control means for rotation in a first plane to provide a first cyclic control input, for rotation in a second plane on an axis orthogonal to that of said main control shaft to provide a second cyclic control input, and for translation in a third plane parallel to said second plane to provide a collective control input;
   first displaceable output means responsive to rotation of said integrated control means in said first plane to provide a first cyclic control command;
   second displaceable output means responsive to rotation of said integrated control means in said second plane to provide a second cyclic control command; and third displaceable output means responsive to translation of said integrated control means in said third plane to provide a collective control command, said displaceable output means collectively including means precluding interaction of said control inputs, and individually including first, second and third control push rods, respectively, interconnected with said integrated control means for longitudinal displacement in response to movements of said integrated control means in said first, second and third planes; and said first and second cyclic control commands and said collective control command comprise, respectively, first, second, and third respective displacements of said control push rods, said displacements being proportional to the magnitude of rotation and translation of said integrated control means in said first, second and third planes, respectively.

5. A flight control means for helicopters comprising:

integrated control means for generating cyclic and collective control function commands for rotor control heads of the swash plate type;

mounting means comprising a main control shaft, bearing means mounting said main control shaft for rotation and translation on its longitudinal axis, a pivot means on one end of said shaft comprising a tilt axis orthogonally disposed with said longitudinal axis, a pitch control crank pivoted on said pivot means in a plane including said longitudinal axis, and hub means on one end of said pitch control crank affixing said integrated control means thereto for rotation and translation with said shaft, whereby rotation of said integrated control means about said longitudinal axis provides a first cyclic control input, translation of said integrated control means along said longitudinal axis provides a collective control input, and rotation of said integrated control means about said tilt axis provides a second cyclic control input;

first displaceable output means responsive to rotation of said integrated control means about said longitudinal axis to provide a first cyclic control command;

second displaceable output means responsive to rotation of said integrated control means about said tilt axis to provide a second cyclic control command; and third displaceable output means responsive to translation of said integrated control means along said longitudinal axis to provide a collective control command;

said displaceable output means including first, second and third control push rods, respectively interconnected with said control means for longitudinal displacement in response to movements of said control means in said first, second and third planes; and wherein said first and second cyclic control commands and said collective control command comprise, respectively, first, second, and third respective displacements of said control push rods, said displacements being proportional to the magnitude of rotation and translation of said integrated control means in said first, second and third planes, respectively.

6. The invention defined in claim 5, wherein said first displaceable output means includes a lateral control lever integral with and extending radially from said main control shaft and rotatable about said longitudinal axis, and first linkage means driven by said lateral control lever and connected to said first control push rod to provide an output displacement proportional to the rotation of said main shaft longitudinally of said first control push rod as said first cyclic control signal;

wherein said second displaceable output means includes a pitch control support lever fixed to said main control shaft, a bell crank means pivotally supported by said support lever, and second linkage means interconnecting said bell crank means between the other end of said pitch control crank and said second control push rod and driven by said pitch control crank to provide an output displacement proportional to the rotation of said pitch control crank on said tilt axis longitudinally of said second control push rod as said second cyclic control signal; and wherein said third displaceable output means includes, a support means, a collective control crank pivotally mounted adjacent the end of said main control shaft on said support means opposite said integrated control means, and third linkage means interconnecting said collective control crank between said end of said main control shaft and said third control push rod and driven by said main control shaft and said control means to provide an output displacement longitudinally of said third control push rod proportional to the axial displacement of said main control shaft as said collective control signal.

7. The invention defined in claim 6, wherein said bell crank means in said second displaceable output means includes bearing means precluding interaction between rotation of said support lever with said main control shaft and said second linkage means.

8. The invention defined in claim 6, wherein said third linkage means of said third displaceable means includes bearing means precluding reaction of said collective crank means to rotation of said main control shaft.

9. The invention defined in claim 6, wherein said bell crank means in said second displaceable output means includes bearing means precluding interaction between rotation of said support lever with said main control shaft and said second linkage means; and wherein said third linkage means of said third displaceable means includes bearing means precluding reaction of said collective crank means to rotation of said main control shaft.

* * * * *